US009184787B2

(12) United States Patent
Yu et al.

(10) Patent No.: US 9,184,787 B2
(45) Date of Patent: Nov. 10, 2015

(54) PREAMBLE DETECTION USING VECTOR PROCESSORS

(71) Applicant: Intel Corporation, Santa Clara, CA (US)

(72) Inventors: Meng-Lin Yu, Morganville, NJ (US); Jian-Guo Chen, Basking Ridge, NJ (US); Alexander Alexandrovich Petyushko, Bryansk (RU); Ivan Leonidovich Mazurenko, Khimki (RU)

(73) Assignee: Intel Corporation, Santa Clara, CA (US)

( * ) Notice: Subject to any disclaimer, the term of this patent is extended or adjusted under 35 U.S.C. 154(b) by 65 days.

(21) Appl. No.: 13/800,167

(22) Filed: Mar. 13, 2013

(65) Prior Publication Data

US 2014/0064338 A1   Mar. 6, 2014

(30) Foreign Application Priority Data

Aug. 30, 2012   (RU) .................................. 2012137095

(51) Int. Cl.
*H04B 1/00* (2006.01)
*H04B 1/709* (2011.01)
*H04B 1/7113* (2011.01)

(52) U.S. Cl.
CPC .............. *H04B 1/709* (2013.01); *H04B 1/7113* (2013.01)

(58) Field of Classification Search
CPC ... H04L 27/265; H04L 5/026; H04L 25/0242; H04L 2027/0095; H04L 7/042; G06F 17/14; G06F 17/142; H04B 1/7113; H04B 7/2668; H04B 1/7087; H04B 17/0047; H04B 1/7115; H04B 1/709; H04B 7/2628
USPC .............. 375/E1.002, E1.032, 343, 150, 142, 375/140; 708/404, 405, 490
See application file for complete search history.

(56) References Cited

U.S. PATENT DOCUMENTS 7,133,387 B2   11/2006   Nakada
8,583,152 B2   11/2013   Ishii et al.
(Continued)

FOREIGN PATENT DOCUMENTS

WO   WO2007104362 A1   9/2007
WO   WO2008057584 A2   5/2008

OTHER PUBLICATIONS

"3rd Generation Partnership Project; Technical Specification Group Radio Access Network; Physical Channels and Mapping of Transport Channels Onto Physical Channels (FDD)," 3GPP (3rd Generation Partnership Project) TS 25.211 V7.6.0 (May 2008) Technical Specification.

(Continued)

*Primary Examiner* — Rahel Guarino
(74) *Attorney, Agent, or Firm* — Schwegman Lundberg & Woessner, P.A.

(57) ABSTRACT

In one embodiment, a programmable vector processor performs preamble detection in a wireless communication network. Implementation of preamble detection in the vector processor is made possible by a set of vector instructions that include (i) a circular load instruction for loading vectors of received data, (ii) a correlation instruction for correlating the vectors of received data with vectors of the scrambling code to concurrently generate a plurality of complex correlations, (iii) a partial-transpose instruction for arranging vectors of the complex correlations for use by a Fast Hadamard Transform (FHT) processor, and (iv) an FHT instruction for performing FHT processing on a vector of complex correlations. Implementing preamble detection in the vector processor allows more of the received data to be processed concurrently. As a result, preamble detectors of the disclosure may detect preambles using fewer clock cycles than that of comparable preamble detectors implemented using hardware accelerators.

21 Claims, 11 Drawing Sheets

(56) References Cited

U.S. PATENT DOCUMENTS

| | | | |
|---|---|---|---|
| 2001/0043582 A1 | 11/2001 | Nakada | |
| 2009/0257421 A1 | 10/2009 | Nakashima et al. | |
| 2010/0027592 A1 | 2/2010 | Arviv et al. | |
| 2010/0067511 A1 | 3/2010 | Peters | |
| 2010/0255867 A1 | 10/2010 | Ishii et al. | |
| 2012/0295657 A1* | 11/2012 | Okazaki | 455/524 |
| 2013/0070867 A1 | 3/2013 | To et al. | |
| 2013/0195007 A1 | 8/2013 | Mazurenko et al. | |

OTHER PUBLICATIONS

"3rd Generation Partnership Project; Technical Specification Group Radio Access Network; Physical Channels and Mapping of Transport Channels Onto Physical Channels (FDD)," 3GPP (3rd Generation Partnership Project) TS 25.211 V9.1.0 (Dec. 2009) Technical Specification.

"3rd Generation Partnership Project; Technical Specification Group Radio Access Network; Multiplexing and channel Coding (FDD)," 3GPP (3rd Generation Partnership Project) TS 25.212 V7.9.0 (Sep. 2008) Technical Specification.

"3rd Generation Partnership Project; Technical Specification Group Radio Access Network; Spreading and Modulation (FDD)," 3GPP (3rd Generation Partnership Project) TS 25.213 V7.6.0 (Sep. 2008) Technical Specification.

"3rd Generation Partnership Project; Technical Specification Group Radio Access Network; Spreading and Modulation (FDD)," 3GPP (3rd Generation Partnership Project) TS 25.213 V9.2.0 (Sep. 2010) Technical Specification.

"3rd Generation Partnership Project; Technical Specification Group Radio Access Network; Physical Layer Procedures (FDD)," 3GPP (3rd Generation Partnership Project) TS 25.214 V6.10.0 (Sep. 2006) Technical Specification.

"3rd Generation Partnership Project; Technical Specification Group Radio Access Network; Physical Layer Procedures (FDD)," 3GPP (3rd Generation Partnership Project) TS 25.214 V9.2.0 (Mar. 2010) Technical Specification.

* cited by examiner

Table I: Sub-matrix $X_j$

| Column $k$ | 0 | 1 | 2 | ... | 62 |
|---|---|---|---|---|---|
| 0 | $x_j$ | $x_{j+16}$ | $x_{j+32}$ | ... | $x_{j+992}$ |
| 1 | $x_{j+1}$ | $x_{j+17}$ | $x_{j+33}$ | ... | $x_{j+993}$ |
| 2 | $x_{j+2}$ | $x_{j+18}$ | $x_{j+34}$ | ... | $x_{j+994}$ |
| ... | ... | ... | ... | | ... |
| 14 | $x_{j+14}$ | $x_{j+30}$ | $x_{j+46}$ | ... | $x_{j+1006}$ |
| 15 | $x_{j+15}$ | $x_{j+31}$ | $x_{j+47}$ | ... | $x_{j+1007}$ |

1  row = (j+k) mod 16;              // mod denotes a modulo operation
2  col = [(j+k)/16];                // the notation [a] means the integer part of a; in our case it will be 0 or 1
3  Xj(k, 0:62) = X(row, col:col+62); // the notation X(row, col1:col2) refers to columns col1 to col2 in a row

FIG. 5

Table II: Scrambling Code Sub-Matrix $SM_a$

| Column \ k | 0 | 1 | 2 | ... | 31 |
|---|---|---|---|---|---|
| 0 | $sm16a$ | $sm16a+16$ | $sm16a+32$ | ... | $sm16a+16*31$ |
| 1 | $sm16a+1$ | $sm16a+17$ | $sm16a+33$ | ... | $sm16a+16*31+1$ |
| 2 | $sm16a+2$ | $sm16a+18$ | $sm16a+34$ | ... | $sm16a+16*31+2$ |
| ... | ... | ... | ... | ... | ... |
| 14 | $sm16a+14$ | $sm16a+30$ | $sm16a+46$ | ... | $sm16a+16*31+14$ |
| 15 | $sm16a+15$ | $sm16a+31$ | $sm16a+47$ | ... | $sm16a+16*31+15$ |

FIG. 6

Table III: Matrix $h_0$ Stored in Memory 212

| Column k | 0 | 1 | 2 | ... | 62 |
|---|---|---|---|---|---|
| 0 | $pc(t,0,0)$ | $pc(t,0,16)$ | $pc(t,0,32)$ | ... | $pc(t,0,496)$ |
| 1 | $pc(t,1,0)$ | $pc(t,1,16)$ | $pc(t,1,32)$ | ... | $pc(t,1,496)$ |
| 2 | $pc(t,2,0)$ | $pc(t,2,16)$ | $pc(t,2,32)$ | ... | $pc(t,2,496)$ |
| ... | ... | ... | ... | | ... |
| 14 | $pc(t,14,0)$ | $pc(t,14,16)$ | $pc(t,14,32)$ | ... | $pc(t,14,496)$ |
| 15 | $pc(t,15,0)$ | $pc(t,15,16)$ | $pc(t,15,32)$ | ... | $pc(t,15,496)$ |

FIG. 7

Table IV: Partial Transpose of Table III for $n=0$

| Value\input | 0 | 1 | 2 | 3 | 4 | 5 | 6 | 7 | ... | 15 |
|---|---|---|---|---|---|---|---|---|---|---|
| In1 | $pc(t,0,0)$ | $pc(t,0,16)$ | $pc(t,0,32)$ | $pc(t,0,48)$ | $pc(t,1,0)$ | $pc(t,1,16)$ | $pc(t,1,32)$ | $pc(t,1,48)$ | ... | $pc(t,3,48)$ |
| In2 | $pc(t,4,0)$ | $pc(t,4,16)$ | $pc(t,4,32)$ | $pc(t,4,48)$ | $pc(t,5,0)$ | $pc(t,5,16)$ | $pc(t,5,32)$ | $pc(t,5,48)$ | ... | $pc(t,7,48)$ |
| In3 | $pc(t,8,0)$ | $pc(t,8,16)$ | $pc(t,8,32)$ | $pc(t,8,48)$ | $pc(t,9,0)$ | $pc(t,9,16)$ | $pc(t,9,32)$ | $pc(t,9,48)$ | ... | $pc(t,11,48)$ |
| In4 | $pc(t,12,0)$ | $pc(t,12,16)$ | $pc(t,12,32)$ | $pc(t,12,48)$ | $pc(t,13,0)$ | $pc(t,13,16)$ | $pc(t,13,32)$ | $pc(t,13,48)$ | ... | $pc(t,15,48)$ |

FIG. 8

PREAMBLE DETECTION USING VECTOR PROCESSORS

BACKGROUND OF THE INVENTION

1. Field of the Invention

The present invention relates to signal processing, and, more specifically but not exclusively, to preamble detection for wide-band code-division multiple access (WCDMA) and other wireless standards.

2. Description of the Related Art

In WCDMA and other wireless standards, user equipment, such as cell phones, transmit preambles to inform base transceiver stations (BTSs) that the user equipment (UE) is available to establish a connection with the network. In systems that adhere to the 3GPP standards, the preamble, which is transmitted on the physical random access channel (PRACH), is a 4,096-chip sequence comprising 256 repetitions of a 16-bit signature code. The 3GPP standard allows for up to 16 different signature codes, commonly referred to as the 16 Hadamard codes, and often, only a subset of the 16 possible signature codes is employed in a given system. Before transmitting, the signature code is scrambled using a long scrambling code. The scrambling code is constructed from scrambling sequences, and there are 8,192 PRACH preamble scrambling codes in total.

When transmitting a preamble, the user equipment randomly chooses one of the available signature codes, scrambles the signature with a preamble scrambling code, and transmits the resulting preamble at the beginning of a WCDMA Acquisition Indicator Channel (AICH) access slot. There are 15 access slots per two frames, and the slots are spaced 5,120 chips apart. The BTS typically does not know a priori which of the randomly chosen signature codes was used in constructing the preamble. Further, the BTS typically does not know the length of the propagation delay of the preamble (i.e., the delay between the time the preamble was transmitted and the time that the preamble is received) because the location of the user equipment within the cell in which the BTS resides is typically unknown to the BTS at the time a connection is requested.

Since the preamble is the first indication of the user equipment to the BTS, the BTS detects the user equipment by correlating received data at the beginning of each AICH access slot. PRACH preamble detection is typically performed by means of implementing a matched filter for each possible signature code in the subset of signature codes. In particular, the received data is correlated with all possible preambles for each signature code in the subset of signature codes and for each possible propagation delay for the cell. Although the particular preamble that was transmitted is not known a priori to the BTS, the BTS typically knows a priori all of the possible preambles that could have been transmitted. The result of these correlations is a correlation profile for each possible signature code, where each correlation profile has a number of values (herein referred to as "correlation profile values" or simply "profile values") that is equal to the number of possible delays. In other words, the total number of correlation profiles is equal to the number of possible signature codes, and the total number of correlation profile values is equal to the number of possible signature codes times the number of possible delays. The correlation profile value for signature s and delay lag may be represented as shown in Equation (1):

$$\text{profile}(s, lag) = \left\| \sum_{i=0}^{L-1} sm_i c_{s,i} x_{i+lag} \right\| \quad (1)$$

where $sm_i$ is the ith chip of the scrambling code multiplied by $$e^{j(\frac{\pi}{4}+\frac{\pi}{2}i)},$$

$c_{s,i}$ is the ith chip of the signature code s, and $x_{i+lag}$ is the (i+lag)th chip of received data corresponding to possible delay lag. Note that here i is the chip index, j is the square root of negative one, and L is the preamble length in chips (e.g., 4,096 chips). Further, as used herein, the term "scrambling code" refers to a scrambling code that is modified by multiplying each chip of the scrambling code by $$e^{j(\frac{\pi}{4}+\frac{\pi}{2}i)}.$$

After all correlation profiles are generated, each correlation profile value is compared to a preamble-detection threshold to detect the signature code that was transmitted and one or more possible propagation delays between the user equipment and the BTS. Each of the one or more possible propagation delays corresponds to a different propagation path of the transmitted preamble. The one or more possible propagation delays may then be provided to a path searcher component to detect the propagation delay of the propagation path that is received first in time. Discussions of preambles and preamble detection may be found in Third Generation Partnership Project (3GPP) Technical Specification (TS) 25.211 V9.1.0 (2009-12) "Physical Channels and Mapping of Transport Channels onto Physical Channels (FDD)," 3GPP TS 25.213 V9.1.0 (2009-12) "Spreading and Modulation (FDD)," and 3GPP TS 25.214 V9.2.0 (2010-03) "Physical Layer Procedures (FDD)," the teachings of all of which are incorporated herein by reference in their entirety.

When a relatively large number of signature codes are employed (e.g., all 16 Hadamard codes), separately performing the above-mentioned matched filter approach for each signature code becomes relatively computationally expensive. In this case, a more-efficient approach to detecting preambles may be employed that is based on the Fast Hadamard Transform by rewriting Equation (1) as shown in Equation (2):

$$\text{profile}(s, lag) = \left\| \sum_{k=0}^{15} \left[ c_{s,k} \sum_{l=0}^{L/16-1} sm_{16l+k} x_{16l+k+lag} \right] \right\| \quad (2)$$

where i=16l+k and k corresponds to one of the 16 bits in a signature sequence where k=0, . . . , 15. Equation (2) is derived from the fact that every signature s comprises 256 repetitions of a 16-bit sequence. As shown in Equation (2), the signature code $c_{s,k}$ is broken out into an outer-most summation. The inner-most summation is performed 16 times, once for each bit k of a 16-bit signature code sequence, to generate 16 partial correlation values pc(k, lag) for the signature s, where $$pc(k, lag) = \sum_{l=0}^{L/16-1} sm_{16l+k} x_{16l+k+lag}.$$

Essentially, Equation (2) divides the chips of received data x, and the corresponding chips of the scrambling code sm, into 16 streams, each stream corresponding to a different bit k of a 16-bit signature code sequence. The chips of received data x are split up and assigned to 16 streams such that received data chips $x_0, x_1, \ldots, x_{15}$ are distributed to streams 0, 1, ..., 15, respectively, received data chips $x_{16}, x_{17}, \ldots, x_{31}$ are distributed to streams 0, 1, ..., 15, respectively, and so forth. Note that each partial correlation value pc(k, lag) may be generated by coherently accumulating all L/16 chips. Alternatively, the L/16 chips can divided into smaller groups, where the chips in each group are coherently accumulated, and then the magnitudes or squares of resulting coherent accumulations are non-coherently accumulated to generate the partial correlation value pc(k, lag).

As a result of the signature code $c_{s,k}$ being broken out into an outer-most summation, the inner-most summation is independent of the signature codes, and therefore, the 16 partial correlations that result from the inner-most summation may be reused for all 16 signature codes. The correlation profiles for all 16 signatures are derived by multiplying the 16×16 Hadamard Matrix with the 16 partial correlations from the inner summation as shown in Equation (2). Such calculation may be accelerated by using the Fast Hadamard Transformation.

Even though the Fast Hadamard Transform approach is more efficient than the matched filter approach, the Fast Hadamard Transform approach still has a computational expense that is relatively high. This is due to the relatively large number of correlations that are performed across the numerous signature codes and delays. Therefore, there is a need for even more-efficient methods of preamble detection that reduce the total number of correlations that are needed to detect preambles without negatively impacting detection accuracy.

SUMMARY OF THE INVENTION

In one embodiment, the invention is a processor-implemented method for detecting a preamble in a data signal transmitted from a transmitter and received at the receiver after a propagation delay, and an apparatus for implementing the method. The method comprises generating a vector of correlation values based on a sub-vector of the received-data signal and a sub-vector of a scrambling code. The vector of correlation values comprises at least first and second correlation values that are generated substantially concurrently, and that correspond to at least first and second possible propagation delays, respectively, of a set of different possible propagation delays. Further, the method comprises updating at least two profile values based on the vector of correlation values, wherein each profile value corresponds to a different combination of (i) a possible preamble of a set of different possible preambles and (ii) a possible propagation delay of the set of different possible propagation delays. Yet further, the method comprises detecting the preamble based on the at least two profile values.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 4 shows Table I, which illustrates the elements of a received data sub-matrix that may be retrieved from the circular loader of FIG. 2;

FIG. 5 shows pseudo-code that may be used by the circular loader in FIG. 2 according to one embodiment of the disclosure to retrieve rows of a received data sub-matrix;

FIG. 6 shows Table II, which illustrates the elements of a scrambling code sub-matrix that may be retrieved from the scrambling code memory in FIG. 2;

FIG. 7 shows Table III, which illustrates a matrix of partial correlation values stored in the partial-correlation value memory in FIG. 2;

FIG. 8 shows Table IV, which illustrates a partial transpose of Table III;

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Due to the complexity of the preamble detection operations discussed above, conventional preamble-detection modules have not been implemented using programmable vector processors. Rather, the complexity of preamble detection has forced designers to implement preamble detection modules in hardware using dedicated hardware accelerators (HWAs) or co-processors. These dedicated hardware accelerators have been either (i) highly specialized, meaning that they perform only preamble detection, or (ii) more general, meaning that they perform other chip-rate tasks such as synchronization of other physical channels, path searching, and symbol despreading. In any event, these hardware accelerators employ dedicated hardware to implement dedicated functionality. For example, the hardware used to implement preamble detection is only usable to implement preamble detection, and may not be used to implement other functions.

This disclosure proposes several vector instructions that make implementation of preamble detection in programmable vector processors possible. A vector processor is a processor that implements an instruction set containing instructions that operate on one-dimensional arrays of data called vectors. Multiple data in a vector typically perform the same operation in a vector instruction. A vector processor is also known as Single Instruction, Multiple Data (SIMD) processor. These vector instructions include a circular load vector instruction vec_circ_load for loading received data, a vector correlation instruction vec_corr for correlating the received data with the scrambling code, a partial-transpose instruction for arranging the data correlated by the vector correlation instruction, and a vector FHT instruction vec_FHT for performing Fast Hadamard Transform processing on the data correlated by the vector correlation instruction. Implementing preamble detection in programmable vector processors using these instructions allows multiple values of the received data, and consequently, multiple profile values, to be processed substantially concurrently, thereby overcoming the complexity issues that have forced designers to implement preamble detection modules in hardware using dedicated hardware accelerators (HWAs) or co-processors. Note that, as used herein, the term "concurrently" refers to the overlapping in at least a portion of time.

Figure 1:
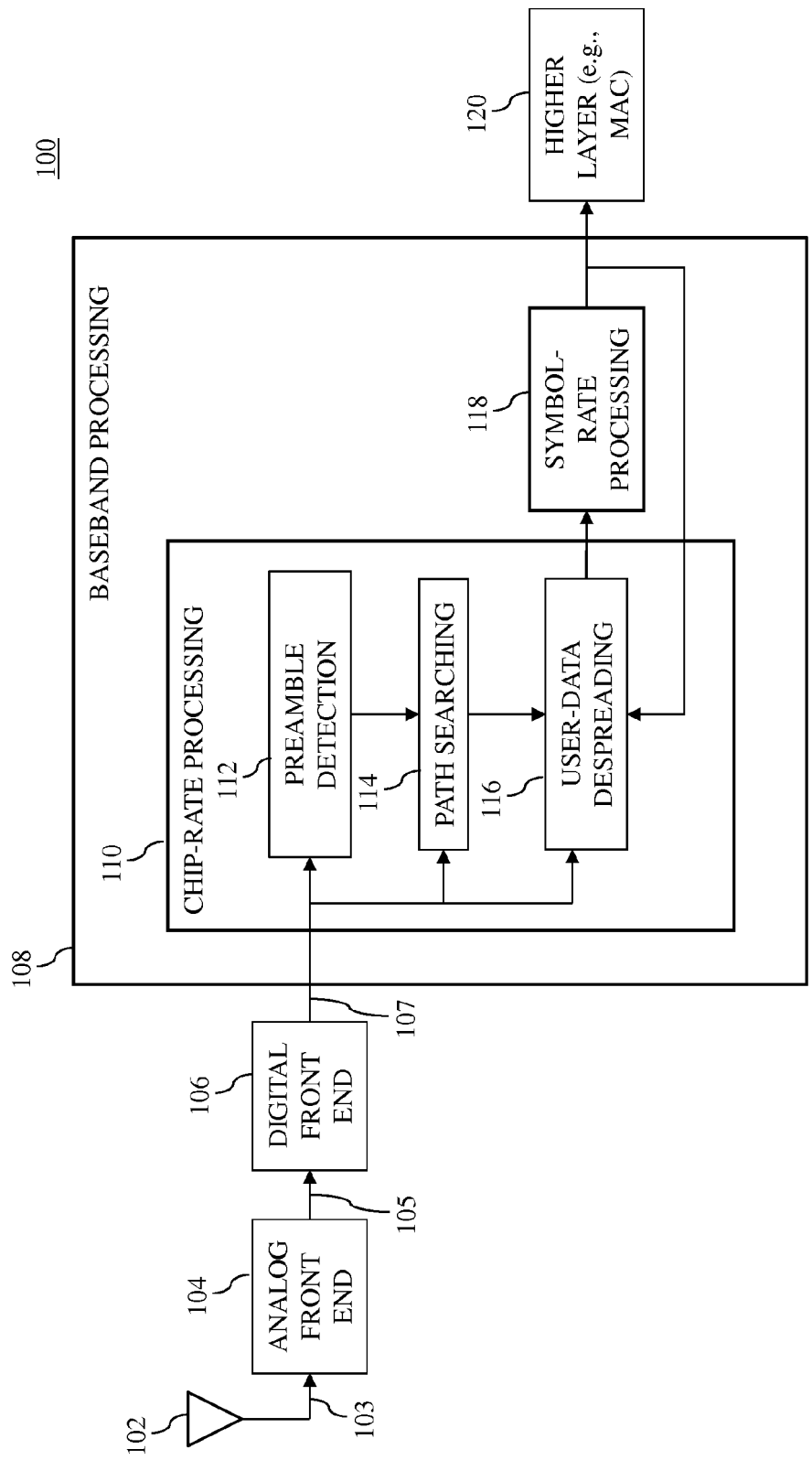
FIG. 1 shows a simplified block diagram of a receiver according to one embodiment of the disclosure.

FIG. 1 shows a simplified block diagram of a receiver 100 according to one embodiment of the disclosure. In receiver 100, an incoming data-modulated analog signal 103 from antenna 102 is processed using analog front end 104. Analog front end 104, which performs processing such as radio-frequency processing, filtering, amplification, and analog-to-digital conversion, provides a digital signal 105 to digital front end 106. Digital front end 106, which performs processing such as demodulation, filtering, down sampling, and carrier extraction, provides a demodulated signal 107 to baseband processor 108, which performs chip-rate processing 110 and symbol-rate processing 118.

Chip-rate processing 110 processes the demodulated digital signal in a chip-rate domain (e.g., two times a 3.84 MHz oversampling rate) using processing such as preamble detection 112, path searching 114, and user-data despreading 116. Preamble detection 112, which is implemented in a programmable vector processor, detects random access requests from new users by detecting transmitted preambles, and possible multi-path delays (each path is known as a finger) of those users. A random access request is then detected by detecting a transmitted preamble from the full correlation values for the selected candidates.

Path searching 114 computes and tracks multi-path delays for each existing user based on profile values received from preamble detection module 112. User-data despreading 116 despreads the received data and determines the data symbols that were most likely transmitted by each user based on the path delays and channel characteristics. Note that each symbol is spread at the transmitter by a channel code and can comprise, for example, 2 chips through 256 chips.

Symbol-rate processing 118 reformats the received data to its original form, using, for example, de-interleaving and de-rate matching, and performs channel estimation and timing and frequency offset estimation. Channel estimation and timing and frequency offset estimation estimate the channel characteristics and the timing and frequency offsets, respectively, for each user. Further, symbol-rate processing 118 performs decoding based on the particular error-correction code used by the transmitter. Yet further, symbol-rate processing 118 may also recombine data from previous partial, unsuccessful transmissions, if such unsuccessful transmissions occurred. The received data is then passed on to a higher layer 120 for further processing.

Figure 2:
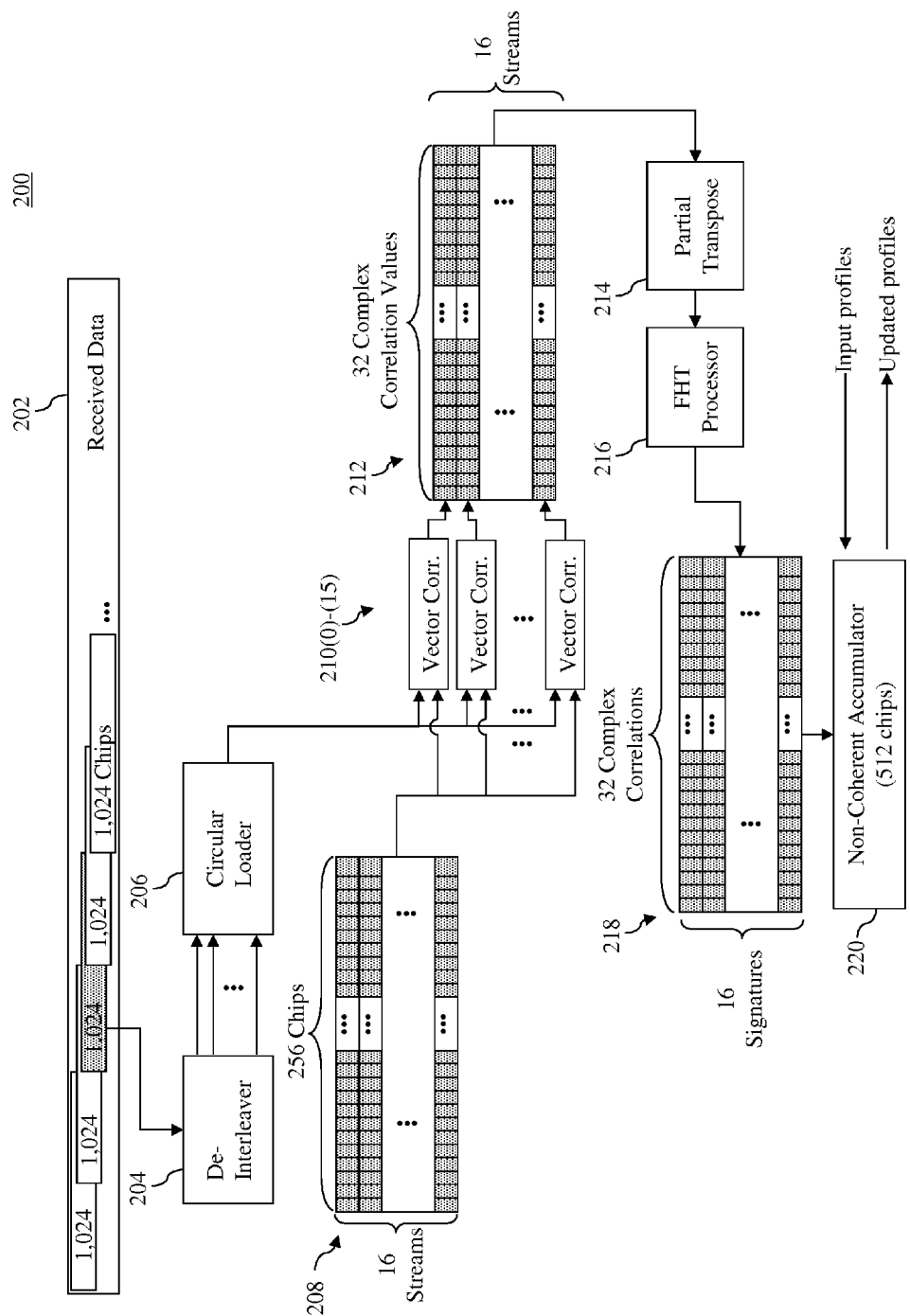
FIG. 2 shows a simplified data-flow diagram of a preamble detection module according to one embodiment of the disclosure.

FIG. 2 shows a simplified data-flow diagram of a preamble detection module 200 according to one embodiment of the disclosure. Preamble detection module 200 may be implemented in a programmable vector processor and may be used to implement preamble detection module 112 of FIG. 1. In general, preamble detection module 200 receives 4,096+max_lag chips of data 202 for each access slot received by the antenna. The 4,096+max_lag chips are divided into chunks t of received data, where (i) each chunk t comprises M (e.g., 1,024) chips and (ii) each chunk t, except for the last, overlaps the subsequent chunk t by 512 chips. Each chunk t is processed using a set of vector operations, including a vector correlation operation, a vector circular load operation, a vector partial transpose operation, and a vector FHT operation. To further explain the operation of preamble detection module 200, FIG. 2 will be discussed together with FIG. 3.

Figure 3:
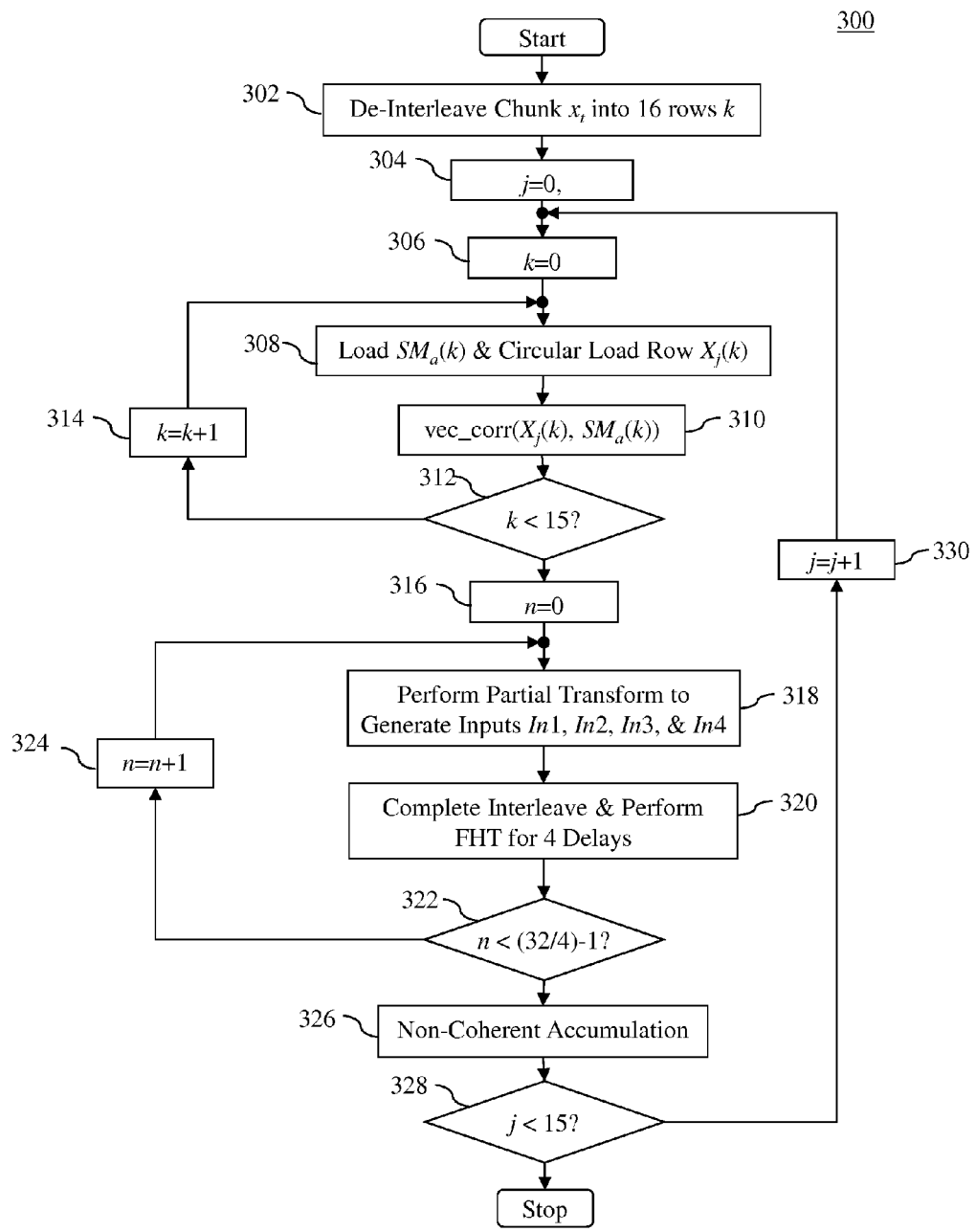
FIG. 3 shows a simplified flow diagram of a method for operating the preamble detection module of FIG. 2 according to one embodiment of the disclosure.

FIG. 3 shows a simplified flow diagram 300 of a method of operating preamble detection module 200 according to one embodiment of the disclosure. In general, each time flow diagram 300 is performed, one chunk t of received data is processed to update 8,192 profile values profile(s, lag) corresponding to each possible combination of the 16 signatures s and 512 delays lag. Upon receiving a chunk t of data, the 1,024 chips $x_i$ in the chunk t are de-interleaved (step 302) by de-interleaver 204 into 16 rows k, where k=0, 1, . . . , 15, such that chips $x_0$ through $x_{15}$ are provided to rows k=0 through k=15, respectively, chips $x_{16}$ through $x_{31}$ are provided to k=0 through k=15, respectively, and so forth. The de-interleaved data forms a 16×64 matrix X that is stored in memory of circular loader 206, which may be implemented, for example, using registers or static random-access memory (SRAM). During the processing of flow diagram 300, sub-matrices $X_j$, where j=0, 1, . . . , 15, are derived from matrix X, and rows of each sub-matrix $X_j$ are retrieved using circular loader 206. To further understand this process, consider FIGS. 4 and 5.

FIG. 4 shows Table I, which illustrates how the elements of each sub-matrix $X_j$ are derived. Each element of each sub-matrix $X_j$ is determined based on the index j of the sub-matrix. For example, for j=0 (i.e., sub-matrix $X_0$), the first column comprises chips $x_0$ through $x_{15}$ of chunk t, the second column comprises chips $x_{16}$ through $x_{31}$ of chunk t, and so forth. Note that, in this specification, parameter j is used two different ways (i.e., as an index of, for example, sub-matrices $X_j$ and as the square root of negative one); however, the meaning should be clear from the context in which it is used.

As shown, each sub-matrix $X_j$ has 16 rows and 63 columns (in contrast to matrix X, which has 16 rows and 64 columns). Each row (or stream) corresponds to a different bit k of the 16-bit signature code sequence as described above in relation to Equation (2). Further, by using only 63 of the 64 columns of matrix X, all 16 sub-matrices $X_j$ can be derived from matrix X, which comprises chips $x_0, x_1, \ldots, x_{1023}$ of one chunk t. For example, the first sub-matrix $X_0$ is derived from chips $x_0, x_1, \ldots, x_{1007}$, while the last sub-matrix $X_{15}$ is derived from chips $x_{15}, x_{16}, \ldots, x_{1022}$.

FIG. 5 shows pseudo-code 500 that may be used by circular loader 206 according to one embodiment of the disclosure to retrieve rows of sub-matrices $X_j$ from matrix X. In line 1 of the pseudo-code, an index of the row of matrix X to be retrieved is determined based on the sub-matrix index j and the sub-matrix row index k, where the term "mod" denotes the modulo operation. In line 2 of the pseudo-code, an index col of the first column of matrix X to be retrieved is determined based on the sub-matrix index j and the sub-matrix row index k. In line 3 of the pseudo-code, the indices of all 63 of the columns in the row of matrix X to be retrieved are determined. Using pseudo-code 500, each row of sub-matrix $X_j$ can be extracted from matrix X in one clock cycle.

Referring back to FIG. 2, in addition to de-interleaving and circular loading the chips of the chunk t of received data, the 4,096 chips $sm_i$ of the scrambling code are de-interleaved into 16 rows k, such that chips $sm_0$ through $sm_{15}$ are provided to rows k=0 through k=15, respectively, chips $sm_{16}$ through $sm_{31}$ are provided to rows k=0 through k=15, respectively, and so forth. The de-interleaved scrambling code chips form a 16×256 matrix SM that is stored in memory 208, which may be implemented, for example, using registers or static random-access memory (SRAM). During the processing of flow diagram 300, sub-matrices $SM_a$, where a=0, 1, . . . , 224, are derived from matrix SM and rows of the sub-matrices $SM_a$ are retrieved using a circular load operation similar to that described above in relation to FIG. 5.

FIG. 6 shows Table II, which illustrates how the elements of each sub-matrix $SM_a$ are derived. As shown, each sub-matrix $SM_a$ has 16 rows and 32 columns. Similar to the elements in sub-matrices $X_j$, each element of each sub-matrix $SM_a$ is determined based on an index of the sub-matrix (in this case, index a). Further, similar to each sub-matrix $X_j$, each row of each sub-matrix $SM_a$ corresponds to a different bit k of the 16-bit signature code sequence as described above in relation to Equation (2).

Referring back to FIGS. 2 and 3, the first row k=0 (step 306) of the first sub-matrix $X_j$, where j=0 (step 304), is output by circular loader 206 in one clock cycle to vector correlator 210(0) (step 308). In one clock cycle, vector correlator 210(0) performs 32 complex correlations (i.e., vec_corr($X_j$(k),$SM_a$(k)) (step 310) using the row $X_0(0)$ of received data and row $SM_a(k)$ of the scrambling code to generate one vector comprising 32 complex correlation values. This process is performed for rows k=1, . . . , 15 (steps 312, 314, 308, and 310), such that each vector correlator 210(0) to 210(15) generates one vector comprising 32 complex correlation values (i.e., 16 total vectors×32 complex correlation values each=512 total complex correlation values).

The operation performed by each vector correlator 210 may be represented as shown in Equation (3):

$$\text{vec\_corr}(X_j(k), SM_a(k)) = \sum_{l=0}^{31} x_{16l+k+j} sm_{16a+16l+k}, \quad (3)$$

$$\sum_{l=0}^{31} x_{16(l+1)+k+j} sm_{16a+16l+k}, \ldots, \sum_{l=0}^{31} x_{16(l+31)+k+j} sm_{16a+16l+k}$$

where each summation is one of the 32 complex correlations and each scrambling code chip is bipodal (i.e., has one of four values: 1+j, 1−j, −1+j, or −1−j, where j is the square root of negative one). A generic discussion of this vector correlation operation (i.e., not within the context of preamble detection module 200) may be found in U.S. patent application publication no. US 2012/0036174, the teachings of which are incorporated herein by reference in their entirety.

The vectors of complex correlation values generated by vector correlators 210(0) to 210(15) form a matrix $h_j$ that is stored in memory 212, where each vector of complex correlation values corresponds to a different row of matrix $h_j$, and each complex correlation value in each vector corresponds to a different column of matrix $h_j$. Each row of matrix $h_j$ (i.e., each vector) corresponds to a different bit k of the 16-bit signature code sequence.

Further, each column of matrix $h_j$ corresponds to a different delay lag. For j=0, the columns of matrix $h_0$ correspond to delays being multiples of 16 and less than 512 (i.e., 512/16=32 delays). Thus, the first column corresponds to delay lag=0, the second column corresponds to delay lag=16, the third column corresponds to delay lag=32, and so on. Note that the remaining 512−32=480 delays are accounted for when j is greater than zero. For example, when j=1, the first column corresponds to delay lag=1, the second column corresponds to delay lag=17, the third column corresponds to delay lag=33, and so on. When j=2, the first column corresponds to delay lag=2, the second column corresponds to delay lag=18, the third column corresponds to delay lag=34, and so on. This pattern is repeated for j=3, 4, . . . , 15 to account for all 512 delays.

Referring back to Equation (2) for a moment, each complex correlation value of matrix $h_j$ corresponds to a different partial correlation value pc(k,lag). Note, however, that each complex correlation value in matrix $h_j$ is generated based on only one chunk t of received data, whereas each of the partial correlation values pc(k,lag) in Equation (2) is generated based on the entire access slot. Thus, if the chunk size M is smaller than the size of the access slot, then each complex correlation value forms only a part of the partial correlation value pc(k,lag) that corresponds to chunk t. In other words, each partial correlation value pc(k, lag) is equal to the sum of the parts of the partial correlation values pc(t,k,lag) as shown in Equation (4):

$$pc(k, lag) = \sum_{t=0}^{(4,096+max\_lag)/M-1} pc(t, k, lag) \quad (4)$$

where 4,096 is the number of chips in an access slot, max_lag is the maximum delay of the cell, and (4,096+max_lag)/M is the number of chunks corresponding to an access slot. For simplicity, the parts of the partial correlation values are referred to herein simply as partial correlation values pc(t,k,lag). Note that the partial correlation values pc(t,k,lag) may be generated using coherent accumulation only or a combination of coherent and non-coherent accumulation in a manner similar to that described in the background. To further understand the arrangement of the complex correlation values in memory 212, consider FIG. 7.

FIG. 7 shows Table III, which illustrates how matrix $h_0$ is stored in memory 212. As shown, the first column comprises the partial correlation values pc(t,k,lag) for delay lag=0, where rows k=0, 1, . . . , 15 store partial correlation values pc(t, 0, 0), pc(t,1, 0), . . . , pc(t,15, 0), respectively. The second column comprises the partial correlation values pc(t,k, lag) for delay lag=16, where rows k=0, 1, . . . , 15 store partial correlation values pc(t, 0, 16), pc(t, 1, 16), . . . , pc(t,15, 16), respectively, and so forth.

Referring back go FIGS. 2 and 3, memory 212, which may be implemented, for example, using registers or static random-access memory (SRAM), is capable of outputting partial correlation values from one row at a time (i.e., row-wise). However, FHT processor 216 processes the partial correlation values column-wise such that all 16 partial correlation values for each delay lag are processed together. To arrange the partial correlation values for FHT processor 216, preamble detection module 200 could interleave the 16 rows of memory 212 on a value-by-value basis to form a single stream of partial correlation values, where every 16 partial correlation values in the stream corresponds to one delay lag.

For example, preamble detection module 200 could interleave the 16 rows of partial correlation values by outputting partial correlation values pc(t,0,0), pc(t,1,0), . . . , pc(t,15,0) corresponding to delay lag=0 from memory 212, followed by partial correlation values pc(t,0,16), pc(t,1,16), . . . , pc(t,15, 16) corresponding delay lag=16, followed by partial correlation values pc(t,0,32), pc(t,1,32), ..., pc(t,15,32) corresponding delay lag=32, and so on. However, implementing such an interleaving operation is computationally expensive, because only one row of memory 212 is accessed at a time and each time that a row of memory 212 is accessed, only one partial correlation value is read out. As a result, memory 212 would be accessed 32×16=512 times to generate the single stream.

Rather than interleave the 16 rows of memory 212 by accessing memory 212 512 times as described above, preamble detection module 200 interleaves the 16 rows in two stages (as discussed in further detail below), where the first stage is implemented by partial transpose 214 and the second stage is implemented by FHT processor 216. In general, each time n that these two stages are performed (steps 318 and 320), 64 partial correlation values are retrieved from memory 212 and interleaved to reproduce four columns of matrix $h_j$, each column corresponding to a different delay lag.

FHT processor 216 transforms (step 320) the four columns to generate four sets of 16 profile update values, one set for each column, that are used to update corresponding correlation profile values profile(s,lag). Each set of profile update values corresponds to a different delay lag, and each of the 16 profile update values in a set corresponds to a different one of the 16 signatures at the delay lag. This process is performed 32/4=8 times n, where n=0, 1, ..., 7 (steps 316, 318, 320, 322, and 324), to transform the partial correlation values corresponding to all 32 columns (i.e., all 32 delays) of matrix $h_j$, thereby generating 512 profile update values that are stored in memory 218, which may be implemented, for example, using registers or static random-access memory (SRAM).

Non-coherent accumulator 220 adds the magnitude or square of each of the 512 profile update values to its corresponding correlation profile value profile(s,lag) to update the partial profile value (step 326). Note that, as used in this specification and the following claims, FHT processor 216 and non-coherent accumulator 220 together are considered to be a profile updater. Steps 302 through 326 are then repeated for each sub-matrix $X_j$, where j=1, 2, ..., 15 (steps 328 and 330), to update 512 different correlation profile values profile (s,lag) for each sub-matrix $X_j$ (i.e., a total of 512×16=8,192 profile values).

The details of the first and second stages 214 and 216 of interleaving and the transform performed by FHT processor 216 are now explained. Each time n that partial transpose 214 performs the first stage of interleaving, memory 212 provides one group of four partial correlation values pc(t,k,lag) from each of the 16 rows of memory 212 to partial transpose 214 (i.e., 64 total partial correlation values pc(t,k,lag)). Partial transpose 214 interleaves the groups of partial correlation values pc(t,k,lag) on a group-by-group basis to generate four interleaved streams In1, In2, In3, and In4 as shown in Equations (5)-(8) below:

$$In1=(h_j(0,4n:4(n+1)-1),h_j(1,4n:4(n+1)-1),h_j(2,4n:4(n+1)-1),h_j(3,4n:4(n+1)-1)) \quad (5)$$

$$In2=(h_j(4,4n:4(n+1)-1),h_j(5,4n:4(n+1)-1),h_j(6,4n:4(n+1)-1),h_j(7,4n:4(n+1)-1)) \quad (6)$$

$$In3=(h_j(8,4n:4(n+1)-1),h_j(9,4n:4(n+1)-1),h_j(10,4n:4(n+1)-1),h_j(11,4n:4(n+1)-1)) \quad (7)$$

$$In4=(h_j(12,4n:4(n+1)-1),h_j(13,4n:4(n+1)-1),h_j(14,4n:4(n+1)-1),h_j(15,4n:4(n+1)-1)) \quad (8)$$

where the notation $h_j$(row, col1:col2) indicates the row and the column range from which the partial values of matrix hj are selected for each group. To further understand the operation of partial transpose 214 and the operations of FHT processor 216, consider FIGS. 8, 9, and 10.

FIG. 8 shows Table IV, which illustrates the partial transpose of Table III of FIG. 7 for n=0. As shown, interleaved stream In1 is generated by interleaving a first group comprising the first four partial correlation values of row k=0 of Table III, followed by a second group comprising the first four partial correlation values of row k=1, followed by a third group comprising the first four partial correlation values of row k=2, and followed by a fourth group comprising the first four partial correlation values of row k=3. Interleaved stream In2 is generated by interleaving a first group comprising the first four partial correlation values of row k=4 of Table III, followed by a second group comprising the first four partial correlation values of row k=5, followed by a third group comprising the first four partial correlation values of row k=6, and followed by a fourth group comprising the first four partial correlation values of row k=7. Interleaved streams In3 and In4 are generated in a similar manner, albeit using partial correlation values from rows k=8 to 11 and rows k=12 to 15, respectively.

Figure 9:
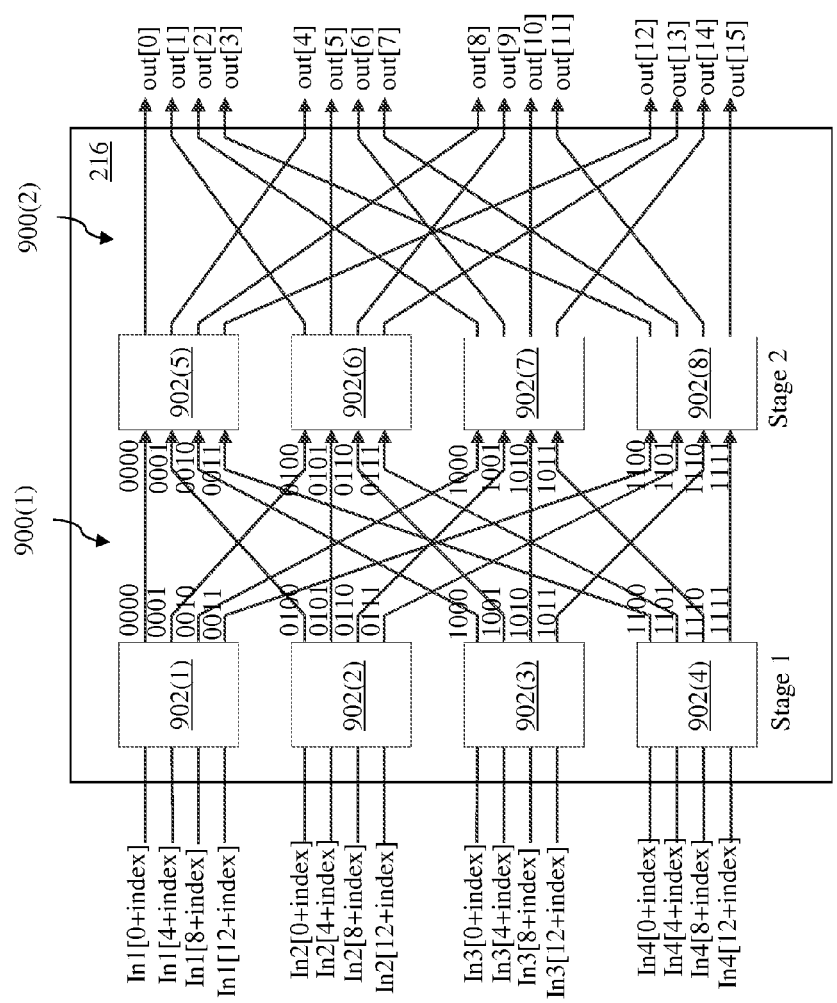
FIG. 9 shows a simplified block diagram of the FHT processor in FIG. 2 according to one embodiment of the disclosure.

FIG. 9 shows a simplified block diagram of FHT processor 216 according to one embodiment of the disclosure. FHT processor 216 is a 16-point Fast Hadamard Transform processor that is implemented using a first stage (i.e., stage 1) of four 4-point FHT processors 902(1)-(4) and a second stage (i.e., stage 2) of four 4-point FHT processors 902(5)-(8). The first stage of 4-point processors is connected to the second stage via a first butterfly connector 900(1), and the second stage of 4-point processors is connected to the output via a second butterfly connector 900(2).

Each butterfly connector 900 comprises 16 inputs that are connected to 16 outputs. The connections between each input and its corresponding output may be summarized as follows. If an input on the left side of the butterfly is encoded in binary as wxyz, then the corresponding output is encoded in binary as yzwx. For example, in first butterfly connector 900(1), the fifth input, which is encoded as 0100, is connected to the second output, which is encoded as 0001.

In operation, FHT processor 216 receives interleaved streams In1, In2, In3, and In4 from partial transpose 214 of FIG. 2. The interleaved streams are received such that values In1[0]-[15] of interleaved stream In1 are provided to 4-point FHT processor 902(1), values In2[0]-[15] of interleaved stream In2 are provided to 4-point FHT processor 902(2), values In3[0]-[15] of interleaved stream In3 are provided to 4-point FHT processor 902(3), and values In4[0]-[15] of interleaved stream In4 are provided to 4-point FHT processor 902(4). Before transforming the four interleaved streams, FHT processor 216 performs the second stage of interleaving on the four interleaved streams to reproduce four columns (i.e., four delays) of matrix $h_j$.

In particular, FHT processor 216 selects 16 partial correlation values pc(t,k,lag) at a time from the four interleaved streams to transform, four partial correlation values pc(t,k,lag) from each interleaved stream. The 16 partial correlation values pc(t,k,lag) are selected using an index value index, where index=0, 1, 2, and 3. For example, for index=0, values In1[0+0=0], In1[4+0=4], In1[8+0=8], and In1[12+0=12] of interleaved stream In1 are selected, values In2[0+0=0], In2 [4+0=4], In2[8+0=8], and In2[12+0=12] of interleaved stream In2 are selected, values In3[0+0=0], In3[4+0=4], In3 [8+0=8], and In3[12+0=12] of interleaved stream In3 are selected, and values In4[0+0=0], In4[4+0=4], In4[8+0=8], and In4[12+0=12] of interleaved stream In4 are selected. Referring back to the example of FIG. 8, for index=0, all 16 partial correlation values for delay lag=0 are selected (i.e., In1[0]=pc(t,0,0), In1[4]=pc(t,1,0), In1[8]=pc(t,2,0), In1[12]=pc(t,3,0), In2[0]=pc(t,4,0), In2[4]=pc(t,5,0), In2[8]=pc(t,6,0), In2[12]=pc(t,7,0), In3[0]=pc(t,8,0), In3[4]=pc(t,9,0), In3[8]=pc(t,10,0), In3[12]=pc(t,11,0), In4[0]=pc(t,12,0), In4[4]=pc(t,13,0), In4[8]=pc(t,14,0), In4[12]=pc(t,15,0)).

Once 16 partial correlation values pc(t,k,lag) are selected for index=0, FHT processor 216 transforms the 16 partial correlation values pc(t,k,lag) to generate 16 profile update values (i.e., out[0]-out[15]), where each of the 16 profile update values corresponds to a correlation profile profile(s, lag) for a different one of the 16 signatures at the delay lag. This process is then repeated for index=1, 2, and 3 to generate a set of 16 profile update values (i.e., out[0]-out[15]) for each index value, where each set of the 16 profile update values corresponds to a different delay lag. Thus, for each interleaved stream provided to FHT processor 216, FHT processor 216 updates the correlation profiles values for the 16 signatures at four different delays.

Figure 10:
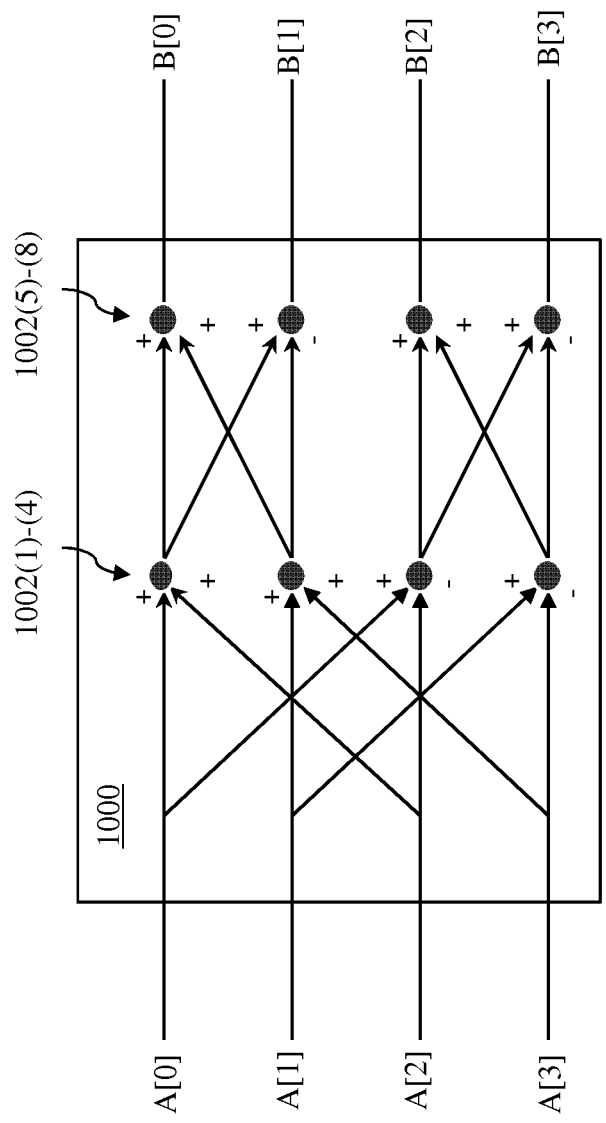
FIG. 10 shows a simplified block diagram of a 4-point FHT processor according to one embodiment of the disclosure that may be used to implement each 4-point FHT processor in FIG. 9.

FIG. 10 shows a simplified block diagram of a 4-point FHT processor 1000 according to one embodiment of the disclosure that may be used to implement each 4-point FHT processor 902. As shown, 4-point FHT processor 1000 receives four input values A[0]-A[3] and generates four output values B[0]-B[3]. The four output values B[0]-B[3] are generated using a first stage of four adders 1002(1)-(4) and a second stage of four adders 1002(5)-(8) as shown in Equations (9)-(12) below:

$$B[0]=A[0]+A[1]+A[2]+A[3] \quad (9)$$

$$B[1]=A[0]-A[1]+A[2]-A[3] \quad (10)$$

$$B[2]=A[0]+A[1]-A[2]-A[3] \quad (11)$$

$$B[3]=A[0]-A[1]-A[2]+A[3] \quad (12)$$

where each addition sign indicates a complex addition operation, and each subtraction sign indicates a complex subtraction operation.

Unlike hardware accelerators, which employ dedicated hardware to implement dedicated functionality, the vector instructions of this disclosure may be re-used to perform other functionality. For example, the vec_corr instruction can be used for filtering unrelated to preamble detection, the vec_FHT instruction can be used for channel quality indicator (CQI) decoding and transport format combination indicator (TFCI) decoding in WCDMA, and the vec_circ_load instruction may be used for many different functions. As a result, preamble detection modules of this disclosure may be implemented with greater flexibility than those implemented using dedicated hardware accelerators.

As explained above, each time that flow diagram 300 of FIG. 3 is performed, one chunk t of received data is processed to update 8,192 profile values profile(s, lag) corresponding to each possible combination of the 16 signatures s and 512 delays lag. Each time that a chunk t is received, however, the chunk t may be processed more than one time using flow diagram 300 to update greater than 8,192 profile values profile(s, lag). To further understand the updating of profile values profile(s, lag) consider FIG. 11.

Figure 11:
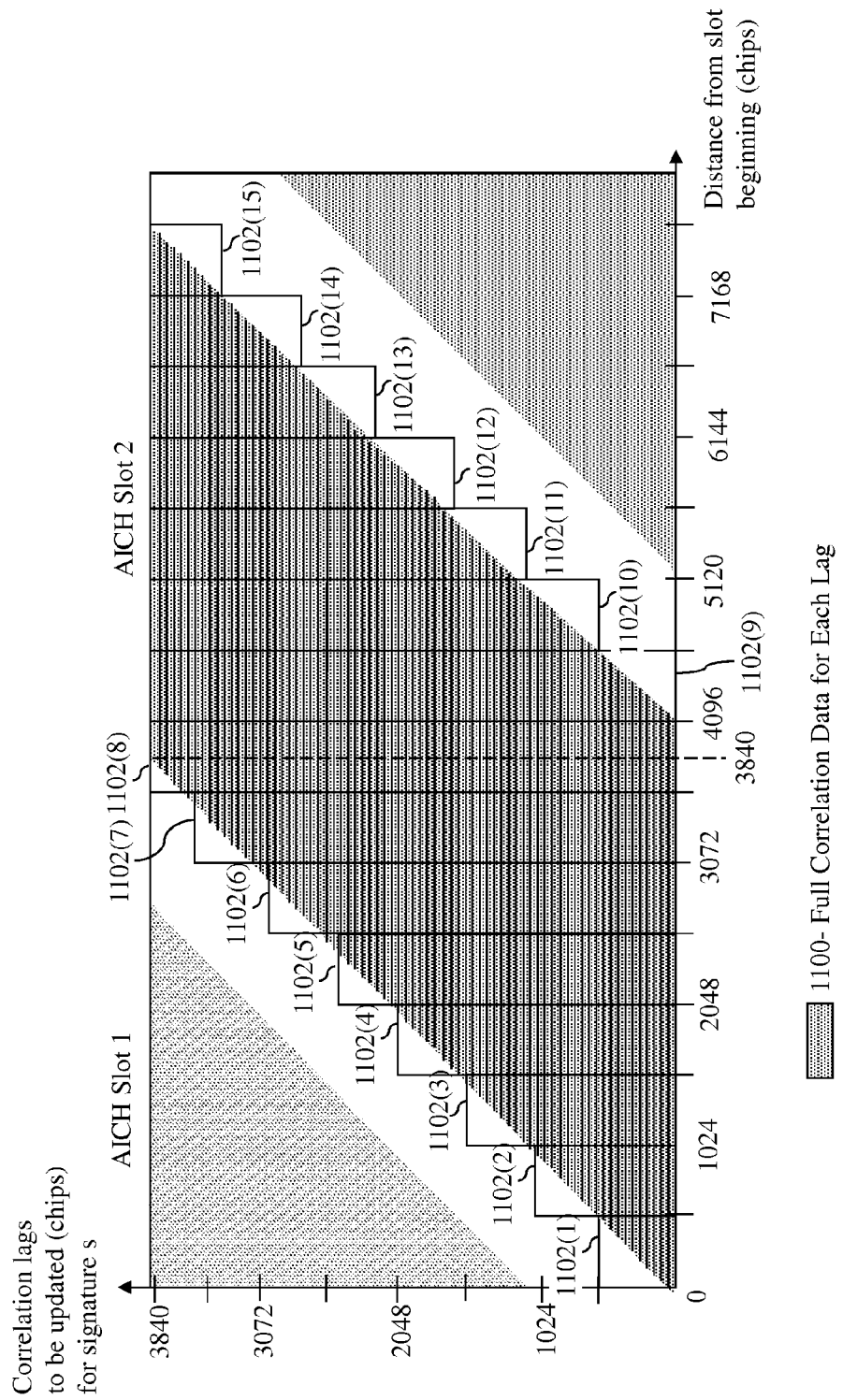
FIG. 11 is a graphical representation of preamble detection according to one embodiment of the disclosure.

FIG. 11 is a graphical representation of preamble detection according to one embodiment of the disclosure. The chip indexes i of the received data relative to the beginning of an access slot (i.e., AICH slot 2) are plotted along the horizontal axis, where the chip index i increases as the distance from the beginning of the access slot increases. The delays lag in chips for which correlations are performed (i.e., for which correlation profile values profile(s, lag) are generated) are plotted along the vertical axis. Note that this graphical representation is for one signature s, and similar representations may be generated for the other 15 signatures s.

Each horizontal bar 1100 illustrates the received data that is needed when a full-profile value profile(s,lag) for a delay lag is generated. For example, for delay lag=0 (on the vertical axis), a window of chips 0 through 4,095 (along the horizontal axis) is used to generate a full-profile value profile(s,0); for delay lag=1, a window of chips 1 through 4,096 is used to generate a full-profile value profile(s,1); for delay lag=2, a window of chips 2 through 4,097 is used to generate a full-profile value profile(s,2); and so on. For purposes of this specification, these windows are considered "sliding windows" since the particular chips for each full-profile value profile(s,lag) vary from one delay lag to the next. Note that, preferably, each successive profile value profile(s,lag) corresponds to one chip of additional delay. Thus, each bar 1100 should have a height equal to one chip, and there should be 512 bars 1100 per 512 delays. However, for ease of illustration, each bar 1100 has a height larger than one chip, and fewer than 512 bars 1100 are shown per 512 delays. Assume for this discussion that each successive bar 1100 corresponds to a delay of one additional chip.

Vertical rectangles 1102(1)-1102(15) illustrate the particular profile values profile(s,lag) that are updated for each overlapping chunk t of received data. Preferably, each chunk t is processed as it is received before processing the next chunk t. For example, upon receiving the first chunk t of received data (i.e., chips 0 through 1,023), profile values profile(s,lag) for delays lag=0, . . . , 511 are updated as illustrated by the portion of bars 1100 within rectangle 1102(1) by performing flow diagram 300 one time. Upon receiving the second chunk t of received data (i.e., chips 512 through 1,535), the profile values profile(s,lag) for delays lag=0, . . . , 1,023 are updated as illustrated by the portion of bars 1100 within rectangle 1102 (2) by performing flow diagram 300 two times: once for delays lag=0, . . . , 511 and once for delays lag=512, . . . , 1,023. Upon receiving the third chunk t (i.e., chips 1,024 through 2,047), profile values profile(s,lag) for delays lag=0, . . . , 1,535 are updated as illustrated by the portion of bars 1100 within rectangle 1102(3) by performing flow diagram 300 three times: once for delays lag=0, . . . , 511, once for delays lag=512, . . . , 1,023, and once for delays lag= 1,024, . . . , 1,535.

Although preamble detection module 200 was described as processing chunks t having M=1,024 chips, wherein the chunks overlap by 512 chips, the disclosure is not so limited. According to various embodiments, preamble detection modules of the disclosure may process overlapping chunks t having greater than or less than M=1,024 chips. Further, various embodiments may be implemented using overlapping schemes other than 512 chips. For example, the number of chips overlapped may be determined by multiplying the number of streams k by the number of complex correlations generated concurrently by each correlator 210 (e.g., 16×32=512). If the number of streams k or the number of complex correlations concurrently generated changes, then the size of the overlap may also change.

Further, according to various embodiments, preamble detection modules of the disclosure may process non-overlapping chunks t. For example, rather than processing chunks t having M=1,024 chips that are overlapped by 512 chips, preamble detection modules of the disclosure may process two non-overlapping chunks t at a time, where each chunk t has 512 chips (i.e., a current chunk and a look-ahead chunk).

According to various embodiments, preamble detection modules of the disclosure may be implemented using FHT processors that are smaller than or larger than 4-point FHTs 902 of FIG. 9.

According to further embodiments, preamble detection modules of the disclosure may be implemented such that more than or fewer than four interleaved streams In are generated by partial transpose 214 and processed by FHT processor 216. Further, such embodiments may interleave groups of partial correlation values from memory 212, where each group has more than or fewer than four partial correlation values from each row of memory 212.

Although preamble detection module 200 was described as processing chunks t of received data (i.e., performing chunk-based processing) as they are received, the disclosure is not so limited. According to alternative embodiments, preamble detection modules of the disclosure may be implemented using slot-based processing, where processing begins when all of the data corresponding to a slot is available. In some embodiments of slot-based processing, the whole access slot of received data can be processed at once, since the whole access slot is available. In this case, memory 212 would need to be large enough to store the entire access slot. In other embodiments of slot-based processing, the access slot can be divided into smaller groups of chips, where each group of chips is processed in a manner similar to that of the chunks in chunk-based processing. Although the disclosure has been described in the context of embodiments that are implemented using programmable vector processors, those skilled in the art will understand that, in general, embodiments of the disclosure may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, or general-purpose computer.

The invention can be embodied in the form of methods and apparatuses for practicing those methods. The invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The invention can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A processor-implemented method for detecting a preamble in a data signal transmitted from a transmitter and received at a receiver after a propagation delay, the method comprising:

generating a vector of correlation values based on a sub-vector of the received-data signal and a sub-vector of a scrambling code, wherein:
the vector of correlation values comprises at least first and second correlation values; and
the at least first and second correlation values correspond to at least first and second possible propagation delays, respectively, of a set of different possible propagation delays;

updating at least two profile values based on the vector of correlation values, wherein each profile value corresponds to a different combination of (i) a possible preamble of a set of different possible preambles and (ii) a possible propagation delay of the set of different possible propagation delays; and detecting the preamble based on the at least two profile values.

2. The method of claim 1, wherein generating a vector of correlation values based on a sub-vector of the received-data signal and a sub-vector of a scrambling code comprises:

correlating a first set of received-data values from the sub-vector of the received-data signal with the sub-vector of the scrambling code to generate the first correlation value corresponding to the first possible propagation delay; and correlating a second set of received-data values from the sub-vector of the received-data signal with the sub-vector of the scrambling code to generate the second correlation value corresponding to the second possible propagation delay.

3. The method of claim 2, wherein the receiver concurrently generates the at least first and second correlation values.

4. The method of claim 2, wherein generating a vector of correlation values based on a sub-vector of the received-data signal and a sub-vector of a scrambling code further comprises generating an additional vector of correlation values based on an additional sub-vector of the received-data signal and an additional sub-vector of the scrambling code, wherein generating the additional vector of correlation values comprises:
   correlating a first set of received-data values from the additional sub-vector of the received-data signal with the additional sub-vector of the scrambling code to generate a first correlation value in the additional vector of correlation values, wherein the first correlation value corresponds to the first possible propagation delay; and
   correlating a second set of received-data values from the additional sub-vector of the received-data signal with the additional sub-vector of the scrambling code to generate a second correlation value in the additional vector of correlation values, wherein the second correlation value in the additional vector of correlation values corresponds to the second possible propagation delay; and
   wherein updating at least two profile values based on the vector of correlation values comprises updating the at least two profile values based on both the vector of correlation values and the additional vector of correlation values.

5. The method of claim 1, wherein updating at least two profile values based on the vector of correlation values comprises:
   applying Fast Hadamard Transform processing to the correlation values corresponding to the first possible propagation delay to update profile values corresponding to one or more signature codes at the first possible propagation delay; and
   applying Fast Hadamard Transform processing to the correlation values corresponding to the second possible propagation delay to update profile values corresponding to one or more signature codes at the second possible propagation delay.

6. The method of claim 1, wherein generating a vector of correlation values based on a sub-vector of the received-data signal and a sub-vector of a scrambling code comprises:
   de-interleaving the received-data signal into k vectors of the received-data signal, where k>1;
   storing each vector of the received-data signal in a different row of memory;
   generating, for each row of the memory, a first vector of correlation values based on a first sub-vector of the received-data signal retrieved from the row, wherein each first vector of the correlation values corresponds to a first subset of possible propagation delays; and
   generating, for each row of the memory, a second vector of correlation values based on a second sub-vector of the received-data signal retrieved from the row, wherein each second vector of the correlation values corresponds to a second subset of possible propagation delays, different from the first subset of possible propagation delays; and
   wherein updating at least two profile values based on the vector of correlation values comprises:
      updating a first subset of profile values based on the vector correlation values corresponding to the first subset of possible propagation delays;
      updating a second subset of profile values, different from the first subset of profile values, based on the vector correlation values corresponding to the second subset of possible propagation delays; and
   wherein detecting the preamble based on the at least two profile values comprises detecting the preamble based on the first and second subsets of profile values.

7. The method of claim 6, wherein:
   the scrambling code is de-interleaved into k vectors of scrambling code, where k>1;
   each vector of the scrambling code is stored in a different row of memory; and
   each vector of correlation values is proportional to:

$$\sum_{l=0}^{31} x_{16l+k} + j sm_{16a+16l+k},$$

$$\sum_{l=0}^{31} x_{16(l+1)+k} + j sm_{16a+16l+k}, \ldots, \sum_{l=0}^{31} x_{16(l+31)+k} + j sm_{16a+16l+k}$$

where x is a received-data value, sin is a scrambling code value, j is an index corresponding to each subset of possible propagation delays for the received-data signal, and a is an index corresponding to each subset of possible propagation delays for the scrambling code.

8. The method of claim 1, wherein generating a vector of correlation values based on a sub-vector of the received-data signal and a sub-vector of a scrambling code comprises:
   de-interleaving a chunk of the received-data signal into k vectors of the received-data signal, wherein k>1 and a size of the chunk of the received-data signal is smaller than a size of an access slot;
   storing each vector of the chunk in a different row of memory; and
   generating a plurality of vectors of correlation values based on sub-vectors of the received-data signal retrieved from the rows of the memory;
   wherein updating at least two profile values based on the vector of correlation values comprises updating a subset of profile values based on the plurality of vector of correlation values, wherein the subset of profile values corresponds to a subset of possible propagation delays; and
   wherein said generating and updating are repeated for a subsequent chunk of the received-data signal, wherein for the subsequent chunk, updating the at least two profile values based on the vector of correlation values comprises updating a subsequent subset of profile values corresponding to a subsequent subset of possible propagation delays, different from the subset of possible propagation delays.

9. The method of claim 1, wherein the method is implemented by a programmable vector processor.

10. The method of claim 1, wherein generating a vector of correlation values based on a sub-vector of the received-data signal and a sub-vector of a scrambling code comprises:
   de-interleaving the received-data signal into k vectors of the received-data signal, where k>1;
   storing each vector of the received-data signal in a different row of memory;
   retrieving, from each row of the memory, a first sub-vector of the received-data signal, wherein each first sub-vector has fewer received-data values than the corresponding vector; and
   retrieving, from each row of the memory, a second sub-vector of the received-data signal;
   wherein each second sub-vector has fewer received-data values than the corresponding vector; and wherein the second sub-vector retrieved from each row is different from the first sub-vector taken from the corresponding row.

11. An apparatus adapted to detect a preamble in a data signal transmitted from a transmitter and received at a receiver after a propagation delay, the apparatus comprising:
a vector correlator adapted to generate a vector of correlation values based on a sub-vector of the received-data signal and a sub-vector of a scrambling code, wherein:
the vector of correlation values comprises at least first and second correlation values; and
the at least first and second correlation values correspond to at least first and second possible propagation delays, respectively, of a set of different possible propagation delays; and
a profile updater adapted to update at least two profile values based on the vector of correlation values, wherein each profile value corresponds to a different combination of (i) a possible preamble of a set of different possible preambles and (ii) a possible propagation delay of the set of different possible propagation delays,
wherein the apparatus is adapted to detect the preamble based on the at least two profile values.

12. The apparatus of claim 11, wherein the vector correlator is adapted to:
correlate a first set of received-data values from the sub-vector of the received-data signal with the sub-vector of the scrambling code to generate the first correlation value corresponding to the first possible propagation delay; and
correlate a second set of received-data values from the sub-vector of the received-data signal with the sub-vector of the scrambling code to generate the second correlation value corresponding to the second possible propagation delay.

13. The apparatus of claim 12, wherein the apparatus concurrently generates the at least first and second correlation values.

14. The apparatus of claim 12, further comprising an additional vector correlator adapted to generate an additional vector of correlation values based on an additional sub-vector of the received-data signal and an additional sub-vector of the scrambling code, wherein generating the additional vector of correlation values comprises:
correlating a first set of received-data values from the additional sub-vector of the received-data signal with the additional sub-vector of the scrambling code to generate a first correlation value in the additional vector of correlation values, wherein the first correlation value corresponds to the first possible propagation delay; and
correlating a second set of received-data values from the additional sub-vector of the received-data signal with the additional sub-vector of the scrambling code to generate a second correlation value in the additional vector of correlation values, wherein the second correlation value in the additional vector of correlation values corresponds to the second possible propagation delay; and
wherein the profile updater is adapted to update the at least two profile values based on both the vector of correlation values and the additional vector of correlation values.

15. The apparatus of claim 14, wherein the profile updater comprises a Fast Hadamard Transform processor adapted to:
apply a Fast Hadamard Transform to the correlation values corresponding to the first possible propagation delay to update profile values corresponding to one or more signature codes at the first possible propagation delay; and
apply the Fast Hadamard Transform to the correlation values corresponding to the second possible propagation delay to update profile values corresponding to one or more signature codes at the second possible propagation delay.

16. The apparatus of claim 11, further comprising:
a de-interleaver adapted to de-interleave the received-data signal into k vectors of the received-data signal, where k>1;
memory adapted to store each vector of the received-data signal in a different row of memory; and
at least one vector correlator adapted to:
generate, for each row of the memory, a first vector of correlation values based on a first sub-vector of the received-data signal retrieved from the row, wherein each first vector of the correlation values corresponds to a first subset of possible propagation delays; and
generate, for each row of the memory, a second vector of correlation values based on a second sub-vector of the received-data signal retrieved from the row, wherein each second vector of the correlation values corresponds to a second subset of possible propagation delays, different from the first subset of possible propagation delays; and
wherein the profile updater is further adapted to:
update a first subset of profile values based on the vector correlation values corresponding to the first subset of possible propagation delays; and
update a second subset of profile values, different from the first subset of profile values, based on the vector correlation values corresponding to the second subset of possible propagation delays, wherein the apparatus detects the preamble based on the first and second subsets of profile values.

17. The apparatus of claim 16, wherein:
the scrambling code is de-interleaved into k vectors of scrambling code, where k>1;
each vector of the scrambling code is stored in a different row of memory; and each vector of correlation values is proportional to:

$$\sum_{l=0}^{31} x_{16l+k+j} sm_{16a+16l+k},$$

$$\sum_{l=0}^{31} x_{16(l+1)+k+j} sm_{16a+16l+k}, \cdots, \sum_{l=0}^{31} x_{16(l+31)+k+j} sm_{16a+16l+k}$$

where x is a received-data value, sm is a scrambling code value, j is an index corresponding to each subset of possible propagation delays for the received-data signal, and a is an index corresponding to each subset of possible propagation delays for the scrambling code.

18. The apparatus of claim 11, further comprising:
a de-interleaver adapted to de-interleave a chunk of the received-data signal into k vectors of the received-data signal, wherein k>1 and a size of the chunk of the received-data signal is smaller than a size of an access slot;
memory adapted to store each vector of the chunk in a different row of the memory; and
at least one vector correlator adapted to generate a plurality of vectors of correlation values based on sub-vectors of the received-data signal retrieved from the rows of the memory;

wherein the profile updater is adapted to update a subset of profile values based on the plurality of vector of correlation values, wherein the subset of profile values corresponds to a subset of possible propagation delays; and wherein the de-interleaver, the memory, the at least one vector correlator, and the profile updater are adapted to process a subsequent chunk of the received-data signal, wherein for the subsequent chunk, the profile updater is adapted to update a subsequent subset of profile values corresponding to a subsequent subset of possible propagation delays, different from the subset of possible propagation delays.

19. The apparatus of claim 11, wherein the apparatus is a programmable vector processor.

20. The apparatus of claim 19, wherein:

the programmable vector processor comprises a circular loader, the vector correlator, and the profile updater;

the circular loader implements a circular load instruction to output sub-vectors of the received-data signal to the vector correlator;

the vector correlator implements a vector correlation instruction to generate the at least first and second correlation values; and the profile updater implements a Fast Hadamard Transform instruction to update the at least two profile values.

21. An apparatus for detecting a preamble in a data signal transmitted from a transmitter and received at a receiver after a propagation delay, the apparatus comprising:

means for generating a vector of correlation values based on a sub-vector of the received-data signal and a sub-vector of a scrambling code, wherein:

the vector of correlation values comprises at least first and second correlation values; and the at least first and second correlation values correspond to at least first and second possible propagation delays, respectively, of a set of different possible propagation delays;

means for updating at least two profile values based on the vector of correlation values, wherein each profile value corresponds to a different combination of (i) a possible preamble of a set of different possible preambles and (ii) a possible propagation delay of the set of different possible propagation delays; and means for detecting the preamble based on the at least two profile values.

* * * * *